United States Patent Office 2,774,400
Patented Dec. 18, 1956

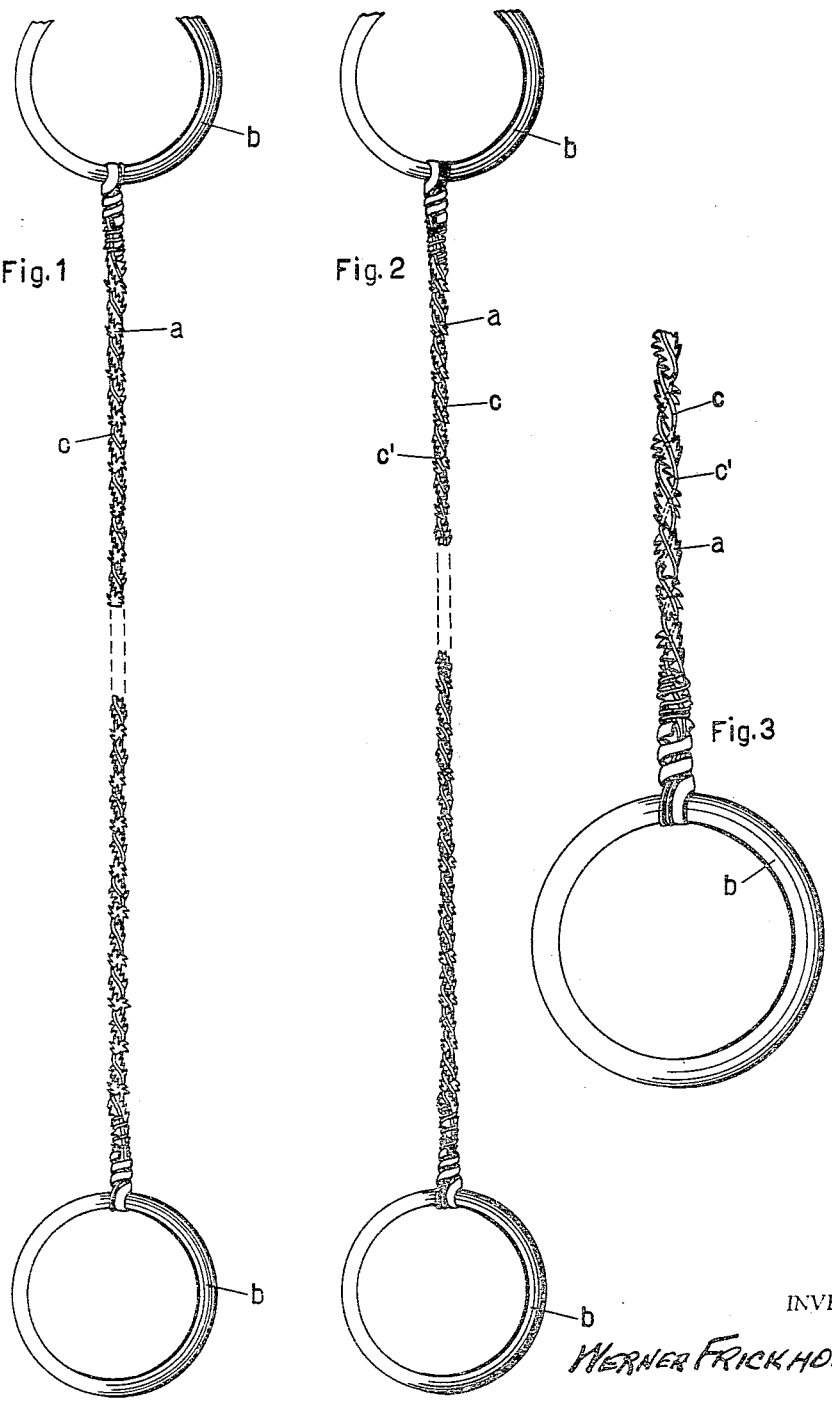

2,774,400
POCKET-SAW WITH WIRE-REINFORCED BLADE

Werner Frickhofen, Schweppenhausen, Germany

Application October 20, 1954, Serial No. 463,456

Claims priority, application Germany April 29, 1954

2 Claims. (Cl. 145—31)

The invention relates to pocket-saws of the kind more particularly adapted for use by foresters, hunters and camping people and consisting of a thin flexible saw blade of steel provided at its ends with handles, for example in the form of rings.

It is known to make such saws of two blades toothed at one edge and laid together with the teeth of the blades in opposite directions and then twisted with each other to form a coherent double-acting blade which cuts in both directions of movement. In view of the small thickness and width of the blades used for the saws in question the making of the teeth already weakens the blades and same are subjected to further weakening by the twisting operation. As a result thereof these double-acting pocket-saws only have a low tensile and breaking strength and also are unsatisfactory as regards their elasticity.

It is the object of the invention to provide a saw of the kind stated with which the above mentioned drawbacks are avoided.

According to the invention the saw has only one blade which is toothed at both edges with the teeth of the opposite edges pointing in opposite directions and which is helically twisted together with at least one steel wire.

This steel wire, which preferably is of circular section, imparts to the blade a considerably increased tensile and breaking strength and the required elasticity.

In a preferred embodiment the double-toothed saw blade is helically twisted together with two or more spaced parallel steel wires, whereby the strength of the blade is still more increased. This embodiment has the additional advantage that even if a breakage of the saw blade should occur the saw can still be used, since the blade is then held between the multiple windings of the steel wires. These saws, therefore, have a long life which practically ends only when the teeth of the saw blade are worn off.

Two embodiments of pocket-saws according to the invention are illustrated in the accompanying drawing.

Fig. 1 is a fractional view of a saw with one strengthening wire and Fig. 2 a similar view of a saw with two strengthening wires, both figures being on a scale about double the natural size of the saw, and Fig. 3 is a view on a still larger scale of a portion of the saw shown in Fig. 2.

The saws consist of a steel blade $a$ fastened by its ends to handles in the form of rings $b$. The saw blade $a$ is toothed at both edges with the teeth of opposite edges pointing in opposite directions so that in use the saw exerts a cutting action in both directions. The blade $a$ is strengthened by being twisted together with one steel wire $c$, as shown in Fig. 1, or with two spaced parallel steel wires $cc'$, as shown in Figs. 2 and 3. If desired, even more than two strengthening wires may be twisted with the saw blade.

Before or during the twisting the blade and wires may be heat-treated to improve the steel of which they are made.

The wire-strengthened blade is fastened to the rings $b$ by winding its terminal portions round the ring and the neighbouring portions of the strengthened blade itself, as shown in the drawing. The terminal portions of the saw blade are toothless, whereby the fastening to the rings is facilitated and injuries to the fingers of the user are avoided.

Having now described my invention, what I claim is:

1. A pocket-saw comprising a saw blade toothed at both edges with the teeth of the opposite edges pointing in opposite directions, at least two steel wires twisted in spaced parallel relation with the saw blade, the terminal portions of the blade being toothless and wound together with the terminal portions of the said wires round rings forming the handles of the saw.

2. A pocket-saw comprising a saw blade and handles fastened to the blade ends, said blade being toothed at both edges and strengthened by being helically twisted together with at least one steel wire, the teeth of the two opposite blade edges being formed so as to point in opposite directions.

References Cited in the file of this patent

UNITED STATES PATENTS

| | | |
|---|---|---|
| 1,954,905 | Wheat | Apr. 17, 1934 |

FOREIGN PATENTS

| | | |
|---|---|---|
| 15,168 | Great Britain | Oct. 22, 1888 |
| 83,541 | Switzerland | Dec. 16, 1919 |
| 163,166 | Great Britain | May 19, 1921 |